A. E. MILLER AND C. E. ANABLE.
ONE WAY SCREW OR BOLT.
APPLICATION FILED JULY 3, 1918.

1,312,409.

Patented Aug. 5, 1919.

Inventors.
Arthur E. Miller.
Clarence E. Anable
By T. Walter Fowler
Atty.

UNITED STATES PATENT OFFICE.

ARTHUR E. MILLER AND CLARENCE E. ANABLE, OF SACRAMENTO, CALIFORNIA.

ONE-WAY SCREW OR BOLT.

1,312,409.          Specification of Letters Patent.       Patented Aug. 5, 1919.

Application filed July 3, 1918. Serial No. 243,193.

*To all whom it may concern:*

Be it known that we, ARTHUR E. MILLER and CLARENCE E. ANABLE, citizens of the United States, residing at Sacramento, in the county of Sacramento and State of California, have invented certain new and useful Improvements in One-Way Screws or Bolts, of which the following is a specification.

Our invention relates to a one-way screw, or a similar permanent fastening of the screw-threaded type and which is so constructed that when it has been once applied, it is next to impossible to remove or withdraw the fastening without breaking or marring the same, so that the act or attempt to withdraw the device will be detected, if done by an unauthorized person.

The object of the invention is to construct a one-way screw, bolt, or other fastening with means thereon to be engaged by a suitable driver for sinking the screw, bolt or fastening in place by a motion in one direction, said means being so fashioned as to reject or cast-off the driver or tool if power is applied thereto in the opposite or unscrewing direction; said fastener or screw having, also, means in the head portion below the outer surface thereof and ordinarily invisible when the screw or bolt is seated in place, which is exposable for the engagement of a suitable tool for unscrewing or withdrawing the screw, by an authorized person.

With the above and other objects in view our invention consists of the improved screw or fastening hereinafter described and claimed.

In the accompanying drawing forming part of this specification and in which similar reference characters indicate like parts in the several views.

In the said drawing the screw, bolt or fastener may be made of any desired material and in the present instance it indicates any of the usual screws, bolts, or like fastenings and particularly those which are designed and known as one-way screws.

This screw or bolt comprises a threaded shank, A, and a head, B, the outer surface of the head being grooved or fashioned with two oppositely inclined surfaces, C, which surfaces are disposed on opposite sides of a transverse line and their inner faces form a pair of shoulders, D, for engagement in one direction with a screw-driver or similar tool, in sinking the screw, or bolt, the aforesaid inclined surfaces being adapted to reject or cast off the driver in any endeavor of the latter to unseat the screw.

Figure 1:
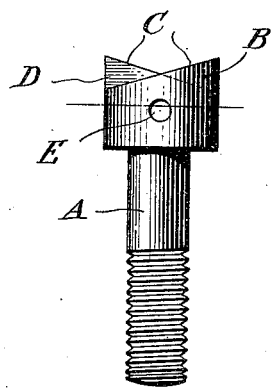
Figure 1 is a side elevation of a screw, bolt or threaded fastener embodying our invention.
Figure 2:
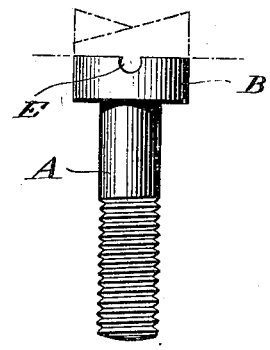
Fig. 2 is a similar view showing a portion of the head of the screw or bolt removed.

While a screw or bolt of the aforesaid construction is not broadly new in the art, such a device has been objectionable for the reason that it contained no means by which it could be unscrewed after it was once fully seated in place. To overcome this objection we construct or fashion the head of the screw or bolt with a hole, E, which extends transversely therethrough below the plane of the inclined surfaces, and when it is desired to withdraw a sunken screw, the head thereof, namely, that portion represented by the shoulders and inclined surfaces before mentioned, may be drilled off, or otherwise removed, by a suitable tool, and until the hole is exposed, as shown in Fig. 2, when the said hole thus becomes the equivalent of the nick of the ordinary screw and is adapted for engagement with the screw driver or tool in the usual manner.

Figure 4:
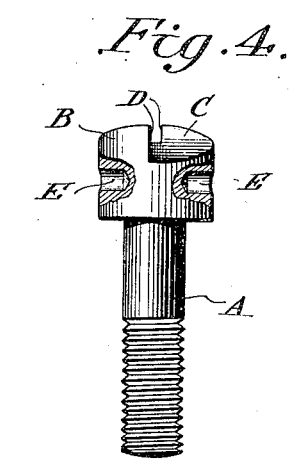
Fig. 4 illustrates a further modified form of screw or bolt.

A similar result can be obtained by simply indenting the sides of the head of the screw at points corresponding to the hole; in other words, the hole need not, necessarily, extend entirely through the head of the screw, but may enter only part-way through the same, as in Fig. 4. In this latter case, a specially prepared screw driver may be required to co-act with the indentations, although the ordinary screw driver may also be used because the point of the drill used for removing the top portion of the screw head, will also remove the center of the head, and the screw driver will operate in the indentations.

Figure 3:
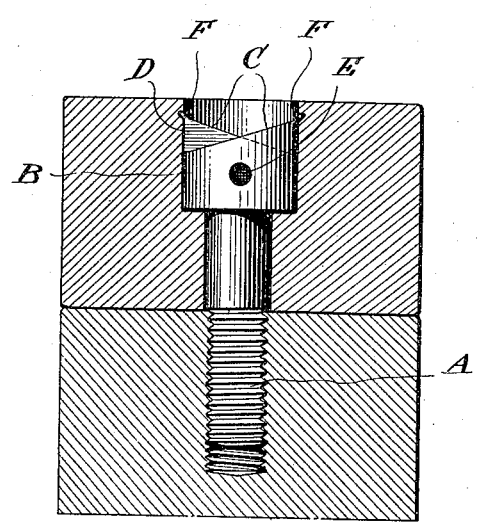
Fig. 3 is a side elevation of a screw or bolt of slightly modified form.

In Fig. 3, we show a modified form of the before described screw or fastening and in this instance we form at the outer end of the inclined surfaces, the clips or ears, F, and which when the screw has been fully seated in place, may be upset or bent to one side and driven into the metal, or other surface to thereby form a secure lock to prevent the screw from becoming loose and working out or unscrewing.

Having thus described our invention what we claim as new and desire to secure by Letters Patent is:

1. As an article of manufacture, a screw, bolt or like fastening having a head-portion fashioned with means engageable by a tool for turning the screw or bolt in one direction, said means rejecting or casting off the tool when the latter is turned in a direction opposite to the first-named direction, and said head portion having means exposable upon removing a portion of the head and serving as a tool-engaging means, for unseating the screw or bolt.

2. A screw, bolt or like fastening having a head with spaced walls forming tool engaging surfaces permitting the screw or bolt to be forcibly turned in one direction only, said screw or bolt having means in its head portion normally concealed when the screw or bolt is seated in place and exposable by removing the portion of the head containing said walls, said exposable part being adapted for the engagement of a tool for unseating the screw or bolt.

3. A screw, bolt or like fastening having tool engaging surfaces permitting the screw or bolt to be forcibly turned in one direction only, said screw or bolt having supplemental means in its head portion normally concealed when the screw or bolt is seated in place and exposable by removing a portion of the head and adapted for the engagement of a tool for unseating the screw or bolt, said head having, also, projections adapted to be deflected and forced into engagement with a part engaged by the screw or bolt, to thereby lock the screw or bolt against accidental reverse rotation.

4. A one-way screw, bolt or like fastening having a head with oppositely inclined surfaces and spaced shoulders, said head having its sides transversely pierced and the portion of the head having the inclines and shoulders being adapted to be removed to expose the pierced area for the application thereto of a tool, whereby the screw or bolt may be unseated.

In testimony whereof we affix our signatures.

ARTHUR E. MILLER.
CLARENCE E. ANABLE.